United States Patent [19]

Brynko

[11] 3,844,811
[45] Oct. 29, 1974

[54] AGGLOMERATION OF PIGMENT PARTICLES AND COMPOSITIONS UTILIZING SAME

[75] Inventor: Carl Brynko, Oakland, N.J.

[73] Assignee: Reprographic Materials, Inc., Pompton Lakes, N.J.

[22] Filed: July 31, 1972

[21] Appl. No.: 276,687

Related U.S. Application Data

[63] Continuation-in-part of Ser. No. 98,080, Dec. 14, 1970, Pat. No. 3,745,118, which is a continuation-in-part of Ser. No. 2,416, Jan. 12, 1970, abandoned.

[52] U.S. Cl.......... 106/309, 106/288 B, 106/288 Q, 106/300, 106/296, 23/314
[51] Int. Cl....... C08h 17/02, C09c 1/04, C09c 1/58
[58] **Field of Search....... 106/309, 307, 300, 288 Q, 106/296, 288 B, 308 Q, 308 N, 308 C; 23/314

[56] References Cited
UNITED STATES PATENTS

| | | | |
|---|---|---|---|
| 2,780,611 | 2/1957 | Te Grotenhins | 106/308 N |
| 2,867,540 | 1/1959 | Harris | 106/308 N |
| 3,129,053 | 4/1964 | Castle | 106/308 Q |
| 3,156,574 | 11/1964 | Gomm et al. | 106/308 Q |
| 3,236,797 | 2/1966 | Williams | 106/308 Q |
| 3,453,360 | 7/1969 | Hill | 106/288 B |
| 3,477,975 | 11/1969 | Concannon | 106/308 N |
| 3,565,658 | 2/1971 | Frazier et al. | 106/308 N |
| 3,743,604 | 7/1973 | Schnoring et al. | 106/308 C |
| 3,745,118 | 7/1973 | Brynko | 106/307 |

FOREIGN PATENTS OR APPLICATIONS

| | | | |
|---|---|---|---|
| 1,042,906 | 9/1966 | Great Britain | 106/288 Q |

*Primary Examiner*—J. Poer
*Assistant Examiner*—James W. Hellwege

[57] ABSTRACT

Relatively spherical pigment particles of uniform size are obtained by mixing a coacervatable material with an aqueous dispersion of water insoluble pigment particles and an ionic surfactant causing coacervation of said system and effecting agglomeration of said pigment particles. The pigments can be agglomerated to any desired size and are useful in preparing toner compositions for electrophotography. Such toners comprise a core of said uniform substantially spherical pigment particles overcoated and substantially completely surrounded by a thermoplastic resinous coating.

16 Claims, No Drawings

AGGLOMERATION OF PIGMENT PARTICLES AND COMPOSITIONS UTILIZING SAME

This application is a continuation-in-part of applicant's earlier application Ser. No. 98,080 filed Dec. 14, 1970, now U.S. Pat. No. 3,745,118 which, in turn, is a continuation-in-part of Ser. No. 2,416 filed on Jan. 12, 1970, now abandoned.

This invention is concerned with the agglomeration of water-insoluble pigments. The term "pigment" as used herein means any water-insoluble solid material including metal oxides such as zinc oxide and iron oxide, inorganic colorants such as carbon black and titanium dioxide and organic dyestuffs and the like. More particularly, this invention relates to agglomerating sub-micron size pigment particles to obtain larger substantially spherical particles of predetermined and desired particle size and of relatively uniform particle size distribution. The particles so obtained are useful as cores for the preparation of toner compositions for application in the electrophotographic arts.

In the widely practiced form of electrophotography known as xerography, a photoconductive layer is charged electrostatically, the charged surface is then exposed to light or other activating radiation source which dissipates the charge in illuminated areas corresponding to the subject to be copied forming a latent electrostatic image in the photoconductive layer. The latent image is made visible (developed) by application (as by dusting or cascading) of a powder to confirm (by adhering electrostatically to charged areas of the layer in proportion to the charge) to the latent image. The powder image is then transferred to another surface such as paper and fixed to such surface as by heat, pressure or solvent treatment or the like.

Usually, the developer powders are composed of a mixture of a "toner" and a "carrier." The toner is composed of a finely divided pigment or coloring matter (usually carbon black) to enable the toner to form a clearly visible image in a tough low melting thermoplastic resin to enable the toner to be permanently affixed by application of heat. The carrier is usually composed of glassbead cores encased in a triboelectric resinous coating and the carrier aids in distributing the toner over the photoconductive layer and deposits it where required. The toner and the carrier are selected so as to be in different positions in the triboelectric series and impart to each other differing electrostatic charges. The toner particles are much smaller than the carrier particles and cover the surface of the carrier when admixed therewith. The art of xerography and the composition of toners is more fully described in U.S. Pat. No. 2,297,691 to Chester F. Carlson; U.S. Pat. No. 2,638,416 to Lewis E. Walkup et al; U.S. Pat. Nos. 2,618,551 and 2,618,552 to said Walkup and Edward E. Wise, respectively.

As generally practiced heretofore, the toner composition is prepared by admixing the pigment and thermoplastic resin by blending, mixing or milling. To obtain a uniform distribution of the pigment in the resin, the blending is generally done in a rubber mill at a temperature above the melting point of the thermoplastic resin. The mixture is fused and allowed to cool and harden. The solid composition is then broken up or pulverized as by ball milling. Toners prepared by this method suffer from a number of disadvantages among which are:

a. Wide particle size distribution. The grinding process is essentially uncontrolled and uncontrollable and the particles obtained vary widely in size. Application of such toners results in dark background and shadow effects attributable to the larger particles and reduced drum life due to the very fine particles adhering to the drum and being difficult to remove;

b. Particles of irregular carbon black content. When the carbon black content is too high, the toner becomes conductive and the development of the image is poor;

c. The particles obtained tend to be angular with sharp edges rather than spherical. This leads to abrasion of the drum thus reducing the drum life and also causing electrical non-uniformity;

d. Non-uniform distribution of carbon black and thermoplastic resin leading to (i) difficulty in affixing the toner to the transfer sheet by reason of particles having insufficient resin or requiring higher melting temperatures, (ii) irregular electrical properties of the various particles; and (iii) non-uniform optical density; and e. Expensive and tedious material and processing operations.

This invention provides an improved process for agglomerating pigment particles to a relatively uniform and desired particle size and of a generally spherical shape, and makes use of such agglomerated pigment particles as a core, over and surrounding which a tough thermoplastic resin is applied, thereby obtaining an improved toner composition of uniform chemical composition and physical properties and capable of yielding copies having high resolution, sharp acuity of print and low background. Further, because it is possible to use high pigment loading in this new process, greater optical density of the image is obtained with less toner.

Agglomeration of pigments has been practiced by wetting the microfine with various vehicles such as water. However, this procedure does not lend itself to the formation of impact resistant agglomerates. Further, these particles clump readily because of the retained liquid in the agglomerate. Other techniques rely on electrostatic charging or mechanical means to form agglomerates and again, since there is no adherent present, do not have sufficient mechanical regidity to retain their original configuration.

Other objects and advantages of the present invention are disclosed in, or will be apparent from, the following more detailed description.

In accordance with this invention, relatively uniform and substantially spherical particles of a pigment having a narrow range of distribution of particle sizes are prepared by mixing a coacervatable material with an aqueous dispersion of pigment particles and an ionic surfactant, causing coacervation and effecting agglomeration.

For example, an aqueous solution or dispersion of coacervatable materials are admixed with or incorporated into an aqueous dispersion of a finely divided pigment and an ionic surfactant, either prior to, during or after coacervation, causing coacervation of said system and effecting agglomeration of the pigment particles. The agglomerated particles may be recovered in dry form by conventional techniques as by decanting and spray or air drying. The particles obtained have a relatively controlled and uniform particle size. By this is meant that the particle size can be controlled so that substantially none of the particles exceeds a predetermined size and that the particle size distribution is sufficiently narrow that about 80 percent of the particles are within ±5 microns of the average mean particle size. For toner compositions pigment particles are obtained which do not contain any substantial number of particles which exceed 30 microns in size, have an average mean particle size within the range of from about 10–20 microns, and have at least 80 percent and preferably 90 percent or more of the particles of a size of from about 5–25 microns.

Generally, it is preferred to initiate coacervation by incorporating the aqueous dispersion of surfactant and finely divided pigment into the coacervatable materials. It should be understood that the aqueous dispersion of surfactant and pigment can be added to the coacervate after coacervation has occurred, or while coacervation is taking place. The pigment dispersion must be so regulated or maintained, as to pH and other conditions, that decoacervation not be caused upon its addition to the coacervate phase.

A coacervatable material is one which has the ability to complex or polymerize in water under changing conditions into a relatively less soluble material and, therefore, this less soluble material separates out of solution into a layer rich in the less soluble material and called the coacervate phase. Generally, materials having an ionizable group in solution are coacervatable. Such materials can be of synthetic or natural origin and may be positively or negatively charged. Positively charged materials can be coacervated by simple or complex coacervation. Negatively charged materials are coacervated by complex coacervation. Suitable positively charged materials include the various natural gelatins, modified gelatins, other proteins, amino acids, imine and amine-containing synthetic polymers, and polyvinyl pyrrolidine. Suitable negatively charged materials usually are water soluble or dispersible polymers containing carboxyl groups and include natural gums such as gum arabic, tragacanth, starches, pectins, carboxy methyl cellulose and synthetic polymers such as styrene-maleic anhydride copolymers, ethylene-maleic anhydride copolymers, polymethacrylic acid, methyl vinyl ether-maleic anhydride copolymers, ethylene-alkyl acrylate copolymers having free carboxylic acid groups, and the like.

Coacervation is generally of two kinds, simple and complex coacervation. Simple coacervation occurs by addition of an electrolyte and reducing the solubility of the coacervatable material. Complex coacervation is obtained by the interaction of two or more coacervatable materials.

Complex coacervation can be caused and is influenced by adjusting: (i) the pH of the solution; (ii) the concentration of the coacervatable materials; and (iii) the temperature of the mixture and dilution with water.

Simple coacervation depends on a variety of interrelated factors including the coacervatable material concentration, temperature, and electrolyte concentration. Too high a concentration of electrolyte may result in uncontrolled too heavy coacervation, whereas insufficient concentration of an electrolyte will not result in coacervation of a simple coacervate system. In complex coacervation systems using two coacervatable materials, the pH must be controlled so that the ionic charges of the coacervatable material are appropriately maintained. Temperature becomes especially important when gellable materials are used. The techniques of coacervation are further described in U.S. Pat. No. Re. 24,899 to B. K. Green and will be readily understood by those skilled in the art.

In order to obtain agglomeration of the pigment particles it is necessary to have a surfactant present in the system while maintaining the foregoing factors, particularly pH, within the coacervation region so as to permit coacervation to occur. In preparing aqueous dispersion of the pigment a surfactant is required to maintain the pigment in suspension. Accordingly, it is convenient to supply a surfactant to the system through the surfactant used in the pigment dispersion.

The surfactant may additionally be used as a coacervatable material or incorporated in the solution of the coacervatable material. The surfactant used as coacervatable material may be anionic, cationic, or a mixture of cationic and anionic surfactants capable of complexing alone or together with another coacervatable material. For example, an anionic or cationic surfactant used to disperse the pigment or a resin binder for the agglomerate in the aqueous system can be caused to coacervate by addition of oppositely charged polyelectrolytic material or surfactant. Coacervation can also be caused between an ionic surfactant and a coacervatable water-soluble or dispersible polymer by temperature, pH, or concentration changes as in other complex coacervations.

The surfactant used may be any of the well-known surface-active agents of the ionic type. Suitable surfactants include the various ionic surface active agents listed in McCutcheon's "Detergents and Emulsifiers," 1968 Annual, John W. McCutcheon, Inc. and that publication is hereby incorporated by reference herein. Nonionic surface active agents may be combined with the ionic surfactant in a number of ways.

When the starting pigment material is carbon black, a carbon black having an average particle size of below 1 micron and usually below about 20 millimicrons is employed. These particles are agglomerated by the process of this invention to an average size of 1 micron to 30 microns or more, depending upon the size requirements of the ultimate use to be made of the pigment. Generally, for toner applications, the average mean particle size should be within the range of from about 10–20 microns and no substantial number of particles should be above 30 microns, and have a particle size distribution so that at least 80 percent and preferably 90 percent or more of the particles have a particle size of from about 5–25 microns.

The ultimate particle size of the pigment is not usually influenced by the parameters which control coacervation. Thus, the coacervatable material used, the pH of the coacervate, the temperature employed, the degree of agitation used, and the concentration of materials does not appear to have any significant effect in the ultimate particle size. The size of the particles obtained is dependent upon a variety of factors including the specific pigment employed, and the particular surfactant and the amount of surfactant used. The size of the particles obtained is also somewhat related to the temperature at which agglomeration takes place. While the temperature must be within coacervation range, lower temperatures generally result in larger particle size. This is believed to be due to the increased viscosity of the system. The most effective means for controlling the average particle size of the pigment particles is the concentration of the surfactant. At a particular temperature within the coacervation range, the higher the concentration of the surfactant the lower the average particle size of the pigment particles. Thus, at a coacervation temperature of about 46°C., the concentration of the surfactant may range, depending on the average particle size of the pigment particles desired, from as low as about 2 to 4 percent by weight based on the weight of the pigment for an average mean particle size of about 20–30 microns to as much as 30 percent by weight of surfactant based on the weight of the pigment to obtain an average pigment particle size of about 1 to 4 microns. At a coacervation temperature of 32°C., a concentration of about 7 to 8 percent by weight of surfactant based on the weight of the pigment can be used to yield an average mean particle size between 15–25 microns, whereas as much as 60 to 75 percent by weight of surfactant based on the weight of the pigment is required to obtain an average means pigment particle size of about 1 to 4 microns. These concentrations will also vary somewhat depending on the nature of the pigment being agglomerated.

Still larger pigment particles may be obtained by forming particles in the 1–5 micron size and then subjecting dispersions of such pigment particles to further agglomeration in the presence of a coacervating system, either by adding additional coacervatable material or regulating the one or more of the coacervation parameters as by reducing the pH or the temperature of the system. An illustration of this technique is given in Example 29.

The following examples will serve to further illustrate the invention and will show how it is presently preferred to practice same.

EXAMPLE 1

10 gms. of "Centura" gelatin and 0.6 gms. of an ethylene-maleic anhydride copolymer are dissolved in 490 ml. of distilled water maintained at a temperature of 32°C. The pH of this system is adjusted to 4.7 using 10 percent acetic acid. At a pH of 4.7 there is a second phase (coacervate) present in the system. To accommodate the addition of the carbon black dispersion the preparations are carried out in a 1,200 ml. beaker and the system agitated with a constant torque "Lightning" stirrer to maintain the separated coacervate phase in approximately 15 micron droplets.

The carbon black dispersion is prepared by dispersing 40 gms. of channel (Monarch 74) carbon black in 350 ml. of distilled water contained in a Waring blendor. To attain a highly dispersed system 10 ml. of "Liqui-Nox" (a 1:1 mixture of anionic and nonionic surfactants in which the anionic surfactants are a linear alkyl aryl sulfonate and sodium xylene sulfonate and the non-ionic surfactant is nonyl phenoxy ethylenoxy ethanol) are added. The Waring blendor requires 15 minutes running to prepare a clump free dispersion. The dispersion has a pH of 5.4. The appearance of the dispersion under a microscope at a 100 X is that of a brown translucent layer indicating particle size is below 0.1 $\mu$.

This dispersion is poured rapidly into a coacervate system which after a few minutes has a pH of 5.1. The pigment particle size is very uniform and at least 80 percent of the particles are in the range 10–30 microns at a temperature of 34°C.

EXAMPLE 2

10 gms. of Centura gelatin and 0.6 gms. of an ethylene-maleic anhydride copolymer is dissolved in 490 ml. of distilled water maintained at a temperature of 34°C. The pH of this system is adjusted to 4.7 using 10 percent acetic acid. At a pH of 4.7 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 15 micron droplets.

The carbon black dispersion is prepared by dispersing 40 gms. of channel (Monarch 74) carbon black in 350 ml. of distilled water contained in a Waring blendor. To attain a highly dispersed system 20 ml. of Liqui-Nox are added. The Waring blendor requires 15 minutes running to prepare a clump free dispersion. The dispersion is at a pH of 6.2. The appearance of the dispersion under a microscope at a 100 X is that of a brown translucent layer indicating particle size is below 0.1 $\mu$.

This dispersion is poured rapidly into the coacervate system. After a few minutes the pH of the system is 5.2. The pigment particle size is very uniform and at least 80 percent of the particles are in the range of 1–5 microns at a temperature of 33°C.

EXAMPLE 3

10 gms. of Centura gelatin and 0.6 gms of an ethylene-maleic anhydride copolymer is dissolved in 490 ml. of distilled water maintained at a temperature of 34°C. The pH of this system is adjusted to 4.7 using 10 percent acetic acid. At a pH of 4.7 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 15 micron droplets.

The carbon black dispersion is prepared by dispersing 40 gms. of furnace (Regal 330 R) carbon black in 350 ml. of distilled water contained in a Waring blendor. To attain a highly dispersed system 10 ml. of Liqui-Nox are added. The Waring blendor requires 15 minutes running to prepare a clump free dispersion. The dispersion is at a pH of 5.9. The appearance of the dispersion under a microscope at a 100 X is that of a brown translucent layer indicating particle size in below 0.1 $\mu$.

This dispersion is poured rapidly into the coacervate system which after a few minutes has a pH of 5.1. Particle size was very uniform and at least 80 percent of the particles are in the range of 8–20 microns at a temperature of 33°C.

EXAMPLE 4

10 gms. of Centura gelatin and 0.6 gms. of an ethylene-maleic anhydride copolymer are dissolved in 490 ml. of distilled water maintained at a temperature of 34°C. The pH of this system is adjusted to 4.7 using 10 percent acetic acid. At a pH of 4.7 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 15 micron droplets.

The carbon black dispersion is prepared by dispersing 40 gms. of furnace (Regal 330R) carbon black in 350 ml. of distilled water contained in a Waring blendor. To attain a highly dispersed system 20 ml. of Liqui-Nox are added. The Waring blendor requires 15 minutes running to prepare a clump free dispersion. The dispersion is at a pH of 6.7. The appearance of the dispersion under a microscope at a 100 X is that of a brown translucent layer indicating particle size is below 0.1 $\mu$.

This dispersion is poured rapidly into the coacervate system which after a few minutes has a pH of 5.1. The pigment particle size is very uniform and at least 80 percent of the particles are in the range of 2–8 microns at a temperature of 34°C.

EXAMPLE 5

10 gms. of Centura gelatin and 5 mls. of Liqui-Nox are dissolved in 490 ml. of distilled water maintained at a temperature of 38°C. The pH of this system is adjusted to 4.4 using 10 percent acetic acid. At a pH of 4.4 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 20–30 micron droplets.

A carbon black dispersion is prepared by dispersing 40 grams of furnace (Regal 330R) carbon black in 350 ml. of distilled water contained in a Waring blendor. To attain a highly dispersed system 10 ml. of Liqui-Nox are added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 4.8. The pigment particle size is very uniform and at least 80 percent of the particles are in the range of 5–15 microns.

EXAMPLE 6

10 gms. of Centura gelatin and 5 mls. of Triton X-172 (a blended alkanyl polyether alcohol with organic sulfates — an anionic surfactant made by Rohm & Haas) are dissolved in 490 ml. of distilled water maintained at a temperature of 38°C. The pH of this system is adjusted to 4.5 using 10 percent acetic acid. At a pH of 4.5 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 5–10 micron droplets.

The carbon black dispersion is prepared by dispersing 40 gms. of furnace (Regal 330R) carbon black in 350 ml. of distilled water contained in a Waring blendor. To attain a highly dispersed system 6 ml. of Triton X-172 are added. The Waring blendor requires 15 minutes running to prepare a clump free dispersion. The dispersion is at a pH of 6.7. The appearance of the dispersion under a microscope at a 100 X is that of a brown translucent layer indicating particle size is below 0.1 $\mu$.

This dispersion is poured rapidly into the coacervate system which after a few minutes has a pH of 4.7. The pigment particle size obtained is very uniform and at least 80 percent of the particles are in the range of 5–10 microns.

EXAMPLE 7

10 gms. of Centura gelatin are dissolved in 490 ml. of distilled water maintained at a temperature of 38°C. The pH of this system is adjusted to 4.0 using 10 percent acetic acid. To accommodate the addition of the carbon black dispersion the preparations are carried out in a 1,200 ml. beaker and the system is agitated with a constant torque Lightning stirrer.

The carbon black dispersion is prepared by dispersing 40 gms. of furnace (Regal 330R) carbon black in 350 ml. of distilled water contained in a Waring blendor. To attain a highly dispersed system 10 ml. of Liqui-Nox are added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the gelatin solution which after a few minutes has a pH of 4.4. At this pH coacervation takes place. The pigment particle size obtained is very uniform and at least 80 percent of the particles are in the range of 5–10 microns at a temperature of 33°C.

EXAMPLE 8

5 gms. of Protector gelatin and 0.3 gms. of E.M.A.-11, an ethylene-maleic anhydride copolymer, are dissolved in 250 ml. of distilled water maintained at a temperature of 38°C. The pH of this system is adjusted to 4.8 using 10 percent acetic acid. At a pH of 4.8 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 15–20 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox are added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 5.3. Pigment particle size is very uniform and at least 80 percent of the particles are in the range of 8–12 microns.

EXAMPLE 9

5 gms. of Protector gelatin and 0.3 gms. of an ethylene-maleic anhydride copolyer (EMS-21) are dissolved in 250 ml. of distilled water maintained at a temperature of 38°C. The pH of this system is adjusted to 4.7 using 10 percent acetic acid. At a pH of 4.7 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 10–15 micron droplets.

The carbon black dispersion was prepared by dispersing 45 gms. of furnace (Regal 330R) carbon black in 300 ml. of distilled water contained in a Waring blendor. To attain a highly dispersed system 10 ml. of Liqui-Nox were added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 5.2. Pigment of particle size is very uniform and at least 80 percent of the particles are in the range of 5–10 microns.

EXAMPLE 10

5 gms. of Centura gelatin and 0.3 gms. of an ethylene-maleic anhydride copolymer (EMA-31) are dissolved in 250 ml. of distilled water maintained at a temperature of 38°C. The pH of this system is adjusted to 4.8 using 10 percent acetic acid. At a pH of 4.8 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 20 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox were added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 5.2. Pigment particle size is very uniform and at least 80 percent of the particles in the range of 8–12 microns.

EXAMPLE 11

5 gms. of Centura gelatin and 5 gms. of gum arabic are dissolved in 250 ml. of distilled water maintained at a temperature of 38°C. The pH of this system is adjusted to 4.7 using 10 percent acetic acid. At a pH of 4.7 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 10 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox are added. The Waring blendor requires 15 minutes running to prepare a clump free dispersion. The dispersion is at a pH of 6.0. The appearance of the dispersion under a microscope at a 100 X is that of a brown translucent layer indicating particles size is below 0.1 $\mu$.

This dispersion is poured rapidly into the coacervate system which after a few minutes has a pH of 5.2. Pigment particle size is very uniform and at least 80 percent of the particles are in the range of 5–20 microns.

EXAMPLE 12

5 gms. of Centura gelatin and 0.4 gms. of a styrene maleic anhydride copolymer are dissolved in 250 ml. of distilled water maintained at a temperature of 38°C. The pH of this system is adjusted to 5.0 using 10 percent acetic acid. At a pH of 5.0 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 8–10 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox were added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 5.6. Pigment particle size is very uniform and at least 80 percent of the particles are in the range of 10–12 microns.

EXAMPLE 13

5 gms. of Centura gelatin and 0.75 gms. of Acrysol A-3, (an acrylic polymer water solution) are dissolved in 250 ml. of distilled water maintained at a temperature of 38°C. The pH of this system is adjusted to 4.7 using 10 percent acetic acid. At a pH of 4.7 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 10 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox are added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 4.9. Pigment particles size is very uniform and at least 80 percent of the particles in the range of 10–20 microns.

EXAMPLE 14

5 gms. of Centura gelatin and 0.4 gms. of Acrysol GS (an acrylic polymer water solution) are dissolved in 250 ml. of distilled water maintained at a temperature of 38°C. The pH of this system is adjusted to 4.8 using 10 percent acetic acid. At a pH of 4.8 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 10–15 micron droplets.

The carbon black dispersion was prepared by dispersing 45 gms. of furnace (Regal 330R) carbon black in 300 ml. of distilled water contained in a Waring blendor. To attain a highly dispersed system 10 ml. of Liqui-Nox were added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 5.1. Pigment particle size is very uniform and at least 80 percent of the particles are in the range of 8–15 microns.

EXAMPLE 15

5 gms. of Centura gelatin and 2 gms. of Tergitol 7 (sodium sulfate derivative of 3,9-diethyl tridecanol-6, an anionic surfactant at 27 percent concentration) are dissolved in 250 ml. of distilled water maintained at a temperature of 38°C. The pH of this system is adjusted to 4.5 using 10 percent acetic acid. At a pH of 4.5 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 5 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox were added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 4.9. Pigment particle size is very uniform and at least 80 percent of the particles are in the range of 2–15 microns.

EXAMPLE 16

5 gms. of Centura gelatin and 2.7 gms. of Tergitol 4 (sodium sulfate derivative of 7-ethyl-2-methyl, 4-undecanol) are dissolved in 250 ml. of distilled water maintained at a temperature of 38°C. The pH of this system is adjusted to 4.6 using 10 percent acetic acid. At a pH of 4.6 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 4–10 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox are added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 5.0. Pigment particle size is very uniform and at least 80 percent of the particles are in the range of 8–15 microns.

EXAMPLE 17

5 gms. of Centura gelatin and 2.0 gms. of Tergitol 08 (sodium salt derivative of 2-ethyl-1-hexanol) are dissolved in 250 ml. of distilled water maintained at a temperature of 38°C. The pH of this system is adjusted to 4.5 using 10 percent acetic acid. At a pH of 4.5 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 3–10 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox (a blend of an alkyl aryl sulfonate and an alkanol amide) are added. The Waring blendor requires 15 minutes running to prepare a clump free dispersion. The dispersion was at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 4.8. Pigment particles size is very uniform and at least 80 percent of the particles are in the range of 5–15 microns.

EXAMPLE 18

5 gms. of Centura gelatin and 1.2 gms. of Tergitol P-28 [sodium di-(2-ethylhexyl phosphate)] are dissolved in 250 ml. of distilled water maintained at a temperature of 38°C. The pH of this system was adjusted to 4.6 using 10 percent acetic acid. At a pH of 4.6 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 10 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox are added. The Waring blendor requires 15 minutes running to prepare a clump free dispersion. The dispersion was at a pH of 6.0. The appearance of the dispersion under a microscope at a 100 X is that of a brown translucent layer indicating particles size in below 0.1 $\mu$.

This dispersion is poured rapidly into the coacervate system which after a few minutes has a pH of 4.8. Pigment particle size is very uniform and at least 80 percent of the particles are in the range of 12–20 microns.

EXAMPLE 19

5 gms. of Centura gelatin and 2 ml. of Liqui-Nox were dissolved in 250 ml. of distilled water maintained at a temperature of 38°C. The pH of this system is adjusted to 4.0 using 10 percent acetic acid. At a pH of 4.0 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 5 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox are added. The Waring blendor requires 15 minutes running to prepare a clump free dispersion. The dispersion was at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 4.6. Pigment particle size is very uniform and at least 80 percent of the particles are in the range of 8–12 microns.

EXAMPLE 20

5 gms. of Centura gelatin and 4 ml. of Triton X-172 (blend of alkaryl polyether alcohols with organic sulfonates) are dissolved in 250 ml. of distilled water maintained at a temperature of 38°C. The pH of this system is adjusted to 4.3 using 10 percent acetic acid. At a pH of 4.3 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 5–10 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox are added. The Waring blendor requires 15 minutes running to prepare a clump free dispersion. The dispersion was at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 4.6. Pigment particle size is very uniform and at least 80 percent of the particles are in the range of 6–10 microns.

EXAMPLE 21

5 gms. of Centura gelatin and 5 ml. of Triton 770 (sodium salt of alkaryl polyether sulfate) are dissolved in 250 ml. of distilled water maintained at a temperature of 38°C. The pH of this system was adjusted to 4.2 using 10 percent acetic acid. At a pH of 4.2 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 2 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox are added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 4.7. Pigment particle size is very uniform and at least 80 percent of the particles are in the range of 5–15 microns.

EXAMPLE 22

5 gms. of Centura gelatin and 6 ml. of Triton W-30 (sodium salt of alkanyl polyether sulfate) are dissolved in 250 ml. of distilled water maintained at a temperature of 38°C. The pH of this system is adjusted to 4.3 using 10 percent acetic acid. At a pH of 4.3 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 20–30 micron droplets.

The carbon black dispersion is prepared by dispersing 45 gms. of furnace (Regal 330R) carbon black in 300 ml. of distilled water contained in a Waring blendor. To attain a highly dispersed system 10 ml. of Liqui-Nox are added. The Waring blendor requires 15 minutes running to prepare a clump free dispersion. The dispersion is at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 4.7. Pigment particle size is very uniform and at least 80 percent of the particles are in the range of 5–10 microns.

EXAMPLE 23

5 gms. of Centura gelatin and 0.5 gms. of Tamol N (polymer type dispersion agent) are dissolved in 250 ml. of distilled water maintained at a temperature of 38°C. The pH of this system is adjusted to 4.0 using 10 percent acetic acid. At a pH of 4.0 there is a second phase (coacervate) present in the system. To accommodate the addition of the carbon black dispersion the preparations are carried out in a 1,200 ml. beaker and the system is agitated with a constant torque Lightning stirrer to maintain the separated coacervate phase in approximately 15–25 micron droplets.

The carbon black dispersion was prepared by dispersing 45 gms. of furnace (Regal 330R) carbon black in 300 ml. of distilled water contained in a Waring blendor. To attain a highly dispersed system 10 ml. of Liqui-Nox are added. The Waring blendor requires 15 minutes running to prepare a clump free dispersion. The dispersion was at a pH of 6.0. The appearance of the dispersion under a microscope at a 100 X is that of a brown translucent layer indicating particle size is below 0.1 $\mu$.

This dispersion is poured rapidly into the coacervate system which after a few minutes has a pH of 4.4. Pigment particle size is very uniform and at least 80 percent of the particles are in the range of 8–10 microns.

EXAMPLE 24

5 gms. of Centura gelatin are dissolved in 250 ml. of distilled water maintained at a temperature of 40°C. The pH of this system is adjusted to 4.0 using 10 percent acetic acid. To accommodate the addition of the pigment dispersion the preparations are carried out in a 1,200 ml. beaker and the system is agitated with a constant torque Lightning stirrer.

The pigment dispersion was prepared by dispersing 40 gms. of titanium dioxide in 300 ml. of distilled water contained in a Waring blendor. To attain a highly dispersed system 10 ml. of Liqui-Nox were added. The Waring blendor requires 15 minutes running to prepare a clump free dispersion. The dispersion was at a pH of 7.6. The appearance of the dispersion under a microscope at a 100 X is that of a white translucent layer indicating particle size is below 0.1 $\mu$.

This dispersion is poured rapidly into the gelatin solution which after a few minutes has a pH of 4.4. At this pH coacervation of the system occurs. Pigment particle size was uniform and at least 80 percent of the particles are in the range of 5–30 microns.

EXAMPLE 25

5 gms. of Centura gelatin are dissolved in 250 ml. of distilled water maintained at a temperature of 40°C. The pH of this system is adjusted to 4.0 using 10 percent acetic acid. To accommodate the addition of the pigment dispersion the preparations are carried out in a 1,200 ml. beaker and the system is agitated with a constant torque Lightning stirrer.

The pigment dispersion is prepared by dispersing 40 gms. of zinc oxide in 300 ml. of distilled water contained in a Waring blendor. To attain a highly dispersed system 5 ml. of Liqui-Nox are added. The Waring blendor requires 15 minutes running to prepare a clump free dispersion. The dispersion was at a pH of 8.7. The appearance of the dispersion under a microscope at a 100 X is that of a white translucent layer indicating particle size is below 0.1 $\mu$.

This dispersion is poured rapidly into the coacervate system which after a few minutes has a pH of 6.0. At this pH coacervation of the system takes place. Pigment particle size is uniform and at least 80 percent of the particles are in the range of 5–30 microns. There is an upward pH drift and acid is added to maintain coacervation pH. After particles are formed the system is chilled rapidly to 10°C to gel the coacervate system.

EXAMPLE 26

In a 1,200 ml. beaker 10 grams of Centura gelatin and 0.6 grams of ethylene-maleic anhydride copolymer are dissolved in 490 ml. of distilled water maintained at a temperature of 38°C. The pH of this system is adjusted to 4.7 using 10 percent acetic acid. At a pH of 4.7 there is a second phase (coacervate) present in the system. Agitation of the system is effected with a constant torque Lightning stirrer to maintain the separated coacervate phase in approximately 15 micron droplets. A carbon black dispersion is prepared by dispersing 40 grams of Regal SR carbon black in 350 ml. of distilled water in a Waring blendor. To attain a highly dispersed system 4 gms. of Daxad-17 (a sodium salt of polymerized alkyl naphthalene sulfonic acid, an anionic surfactant made by Dewey & Almy Chem. Div. of W. R. Grace & Co.) and 2.4 grams of Triton GR 5 (60 percent dioctyl sodium sulfosuccinate) are added. The Waring blendor is run for 15 minutes to obtain a clump free dispersion. The carbon black dispersion is at a pH of 4.5, and the particle size is below 0.1 microns. This dispersion is poured rapidly into the coacervate system which after a few minutes reaches a pH of 4.8. The particle size is very uniform and at least about 80 percent of the particles are of 15–25 microns in size.

EXAMPLE 27

10 gms. of Centura gelatin is dissolved in 240 ml. of distilled water maintained at a temperature of 30°C. The pH of this system is adjusted to 4.5 using 10 percent acetic acid. To accommodate the addition of the carbon black dispersion the preparations are carried out in a 2,000 ml. beaker and the system is agitated with a constant torque lightning stirrer.

The carbon dispersion is prepared by dispersing 40 gms. of Regal 330R carbon black in 250 ml. of distilled water contained in a Waring blendor. To attain a highly dispersed system 5 ml. of Triton GR 5 (an anionic surfactant 60 percent active ingredient- dioctyl sodium sulfosuccinate) is added. The Waring blendor requires 15 minutes running to prepare a clump free dispersion. The dispersion is at a pH of 7.4 and was adjusted to a pH of 4.7 using 10 percent acetic acid. The temperature is maintained at 28°C. The appearance of the dispersion under a microscope at a 100 X is that of a brown translucent layer indicating a particle size below 0.1 $\mu$.

The dispersion is poured rapidly into the gelatin solution and the pH is adjusted to 4.0. Particle size was very uniform and in a range of 10–25 microns.

EXAMPLE 28

10 grams of Centura gelatin are dissolved in 100 ml. of water at a temperature of 40°C. To this solution is slowly added 500 ml. of a mixture of 186 grams of sodium sulfate in 625 ml. of water to cause a coacervate to form. A carbon black dispersion is prepared by dispersing 40 grams of Regal 330R carbon black in 250 ml. of distilled water in a Waring blendor. 5 mls. of Triton GR-5 (60 percent active ingredient dioctyl sulfosuccinate) are added. The Waring blendor is run for 15 minutes to prepare a clump free dispersion. The carbon black dispersion is poured rapidly into the gelatin solution while maintaining the temperature of the system at 40°C. The pigment particles obtained are in the range of from 5 to 50 microns.

EXAMPLE 29

In a 1,200 ml. beaker, 10 grams of Centura gelatin are dissolved in 240 ml. of distilled water maintained at a temperature of 38°C. The pH of this system is adjusted to 4.0 using 10 percent acetic acid. The system is agitated with a constant torque Lightning stirrer. A carbon black dispersion is prepared by dispersing 40 grams of Regal 330R carbon black in 250 ml. of distilled water in a Waring blendor. To this system 12 grams of Triton GR 5 surfactant (60 percent dioctyl sulfosuccinate) is added. The Waring blendor is run 15 minutes to prepare a clump free dispersion. The dispersion is at a pH of 6.9, and the pigment particles are less than 0.1 microns. The carbon black dispersion is poured rapidly into the coacervate system which after a few minutes reaches a pH of 4.3. The temperature is maintained at 38°C. At a pH of 4.3 at least 80 percent of the particles agglomerated to within a size of 1 to 5 microns. Lowering of the pH to about 3.7 yields particles 80 percent of which are in the range of 5 to 10 microns. The system is cooled to 32°C and 5 grams of Centura gelatin dissolved in 250 ml. of water is added while maintaining the pH at 3.8. The pigment particles obtained are 80 percent within the range of from about 10 to 25 microns.

EXAMPLE 30

A dispersion of carbon black was prepared by mixing 40 parts of furnace carbon black (Regal 330R) with 4 parts of Daxad 17(a sodium salt of polymerized alkyl naphthalene sulfonic acid, an anionic surfactant) and 56 parts of water. This dispersion had a pH of 8.5.

Twenty-five grams of this dispersion was diluted with 25 cc. of water and to this was added 50 milliliters of a solution having a pH of 7.3 prepared by dissolving 20 grams of a 50 percent solution of Hyamine 2389 in 500 milliliters of water. Hyamine 2389 is methyl dodecylbenzyl trimethyl ammonium chloride and methyl dodecyl xylene bis (trimethyl ammonium chloride), a commercial cationic surfactant sold by Rohm & Hass Company. Upon mixing the carbon black dispersion with the cationic surfactant solution coacervation was effected and large and distinct agglomerates were formed, 80 percent were in the range of 30–50 microns.

Another agglomerate was prepared by admixing 25 grams of the carbon black dispersion prepared as in the first paragraph of this Example with 25 cc of water and to this admixture was added 10 milliliters of a solution prepared by dissolving 20 grams of a 50 percent solution of Hyamine 2389 in 500 milliliters of water. Upon mixing coacervation occurred and agglomerates were formed, 80 percent of which were a particle size of from 2 to 5 microns.

EXAMPLE 31

A carbon black dispersion was prepared by mixing 10 grams of furnace black Regal 330R in 200 milliliters of water using 4 grams of cationic surfactant Hyamine 2389 as dispersing agent.

To 50 milliliters of this dispersion was added 50 milliliters of an anionic surfactant solution prepared by dissolving 10 grams of Daxad 17 in 500 milliliters of water. The pH of the anionic surfactant solution was 9.4.

Upon mixing coacervation was effected and large and distinct agglomerates were formed in which 80 percent of the particles were within the range of 25 to 50 microns.

EXAMPLE 32

A commercial resin emulsion, Piccopale C-1 (a thermoplastic non-aromatic hydrocarbon resin having an average molecular weight of 1,400, manufactured by Pennsylvania Industrial Chemical Corporation) which is stabilized with a cationic surfactant, was diluted in a ratio of 1 part to 9 parts water.

The carbon black dispersion prepared as described in Example 30 was diluted in a ratio of 1 part dispersion to 1 part water. One hundred milliliters of the resin emulsion was mixed with 25 milliliters of the diluted carbon dispersion. Coacervation was effected and agglomeration occurred, carbon black particles having an average mean size of 10 to 30 microns, i.e. 80 percent of the particles were in said range.

When 50 milliliters of resin emulsion and 25 milliliters of carbon dispersion were mixed, larger discrete agglomerates were obtained, 80 percent of which have a particle size of 5 to 10 microns.

EXAMPLE 33

A carbon black dispersion was prepared by mixing 10 grams of Regal 330R in 200 cc of water using 4 grams of anionic surfactant Triton GR-5 (60 percent dioctyl sodium sulfosuccinate).

50 cc of this dispersion was mixed with 100 cc of the diluted resin emulsion as prepared in Example 32. Coacervation occurred on intermixing and large and distinct pigment agglomerates were obtained. 80 percent of the particles had a particle size of 30 to 50 microns.

EXAMPLE 34

A commercial resin emulsion, Rhoplex AC-61 (an acrylic emulsion polymer manufactured by Rohm & Haas) which is stabilized with an anionic surfactant, was diluted with water in a ratio of 1 part emulsion to 9 parts water.

One hundred milliliters of this emulsion was mixed with 50 milliliters of the carbon black dispersion prepared as shown in Example 31. Upon rapid mixing coacervation occurs and distinct pigment agglomerates were formed. 80 percent of the particles had a size of from 10–30 microns.

EXAMPLE 35

A solution of anionic polymer was prepared by dissolving 5 grams of EMA-1103, an ethylene-maleic anhydride copolymer, in 95 grams of water utilizing sufficient sodium hydroxide to facilitate solubilization.

One hundred milliliters of the carbon black dispersion prepared with the cationic surfactant as described in Example 31 was mixed with 5 milliliters of the above solution of anionic polymer. Coacervation occurs and distinct and uniform agglomerates were obtained. 80 percent of the particles were of a size of from 10 to 30 microns.

EXAMPLE 36

A solution of gelatin was prepared by dissolving 4 grams of Protector gelatin in 200 cc of water by warming to 50°C. until all gelatin is dissolved and then allowing it to cool to room temperature. This solution has a pH of 5.7.

40 cc of the gelatin solution was adjusted to a pH of 4.5 with 10 percent acetic acid. A carbon black dispersion as prepared in Example 30 is diluted in a ratio of 1 part of dispersion to 7 parts of water. 10 cc of this diluted carbon black dispersion was added to the gelatin solution with mixing. Coacervation occurred and the pigment particles agglomerated. 80 percent of the particles were of 10–20 microns.

The gelatin solution prepared above was adjusted to a pH of 8.5 with 10 percent NaOH. The diluted carbon black dispersion as prepared above was mixed with this alkaline gelatin solution but coacervation did not occur nor were any agglomerates obtained.

A second carbon black dispersion was prepared by dispersing 50 g of Regal 330R carbon black in 500 cc of water using 10 grams of Hyamine 2389 cationic surfactant.

A 40 cc portion of carbon black was added to each of the 10 cc portion of Protector gelatin solutions and adjusted to a pH value of 4.5 and 8.5, respectively. Coacervation and agglomeration was obtained with the portion adjusted to a pH of 8.5 but was not obtained with the portion adjusted to a pH of 4.5. About 80 percent of the agglomerates obtained in the alkaline adjustment were of 50 to 75 microns.

EXAMPLE 37

A carbon black dispersion was prepared by diluting 100 cc of the dispersion as described in Example 30 to 200 cc of water and dissolving therein 26 additional grams of Daxad 17 anionic surfactant to bring the total concentration of anionic surfactant to 15 percent by weight. This dispersion had a pH of 8.5 and an appearance under a microscope at 100 X of a brown translucent haze.

Another carbon black dispersion was prepared by admixing 50 g of Regal 330R carbon black with 500 cc of water using 10 g. of Hyamine 2389 cationic surfactant.

A solution of an anionic polymer was prepared by diluting 50 cc of Acrysol WS-24 (a 36 percent by weight solution in water of a styrene-alkylacrylate copolymer containing free carboxylic acid groups made by Rohm & Haas) with an equal volume of water.

A portion of this anionic polymer solution was adjusted to a pH of 11 by the addition of concentrated ammonia. To 20 cc of this adjusted solution was added by rapid pouring and mixing 30 cc of the anionic carbon black dispersion. The pH of this mixture is 10.8. Coacervation occurs and 80 percent of the pigment particles obtained were of a size of from 1–5 microns.

20 cc of the solution of Acrysol WS-24 whose pH had been adjusted to 11 was added with rapid stirring to 30 cc of the cationic carbon black dispersion described above and coacervation occurred and pigment agglomerates were obtained, 80 percent of which had a size of from 30 to 75 microns.

EXAMPLE 38

33 grams of the carbon black dispersion prepared as described in Example 30 was diluted to 200 cc with water.

To 30 cc of Crilitone 30 (a 40 percent by weight dispersion of a styrene-alkylacrylate copolymer having free carboxylic acid groups in water with a non-ionic surfactant manufactured by Jersey State Chemical Corp.) is added 20 cc of the above carbon black diluted dispersion. The pH of the mixture is 6.7. Coacervation occurs upon the mixing of the two dispersions and 80 percent of the pigment particles obtained were from 2 to 5 microns.

The agglomerated pigment particles obtained in the foregoing examples may be used as a core for the preparation of toner compositions. This core is made up of the pigment particles admixed with and adhered by the coacervate. In preparing a toner, a thermoplastic fusible resin is applied over and around the pigment core so that it substantially surrounds the core. A convenient method for doing this is by spray-drying. The amount of resin used in preparing the toner will depend upon a variety of factors including the surface area of the pigment core, the optical density desired, the particular coacervatable materials and resins employed, and the degree of fusibility required. Generally, the pigment core (agglomerate of pigment and coacervate) is about 30 percent by weight based on the total weight of resin and pigment core, although it is preferred that the amount of pigment core be substantially the same as, or in excess of, the amount of thermoplastic resin employed. Preferably, the amount by weight of pigment core based on the total weight of pigment core and thermoplastic fusible resin will vary from about 40 to 67 percent by weight. The pigment core must be present in sufficient amount to produce a clear visible image and the thermoplastic resin is required in an amount capable of fusing the toner composition to the surface to which applied. The core may be overcoated or substantially surrounded by the tough thermoplastic resins conventionally employed in the art. Such resins must be insulating in character, non-tacky at ordinary temperatures, and fusible at a temperature below the char point of the papers or surfaces to which applied, usually at a temperature below about 250°F. Various natural and synthetic resins may be employed. Suitable thermoplastic materials include phenol-formaldehyde resins and modified phenolformaldehyde resins (e.g. Amberol F71), polymerized methacrylates, such as butyl methacrylate or methyl methacrylate, polystyrene, polymers of alkyl acrylates, such as polyethylacrylate, polybutylacrylate, polyesters and various blends and mixtures of such materials. Plasticizers may be used to modify the softening temperature of the thermoplastic resin.

The core of pigment material can be overcoated or surrounded by the thermoplastic resin material in a variety of ways. The resin can be applied to the core from an emulsion, or solution, or by phase separation techniques followed by drying. Thus, for example, an aqueous emulsion containing 65 percent by weight of polystyrene and 35 percent by weight of butyl methacrylate is prepared using a "volatile" emulsifying agent (i.e. are decomposable at about 60°C. or higher). To this emulsion is added the pigment (e.g. carbon black) agglomerate core having an average mean particle size of about 10–20 microns and having at least 80 percent of its particles of a size of from about 5–25 microns, the core representing about 80–85 percent by weight based on the total weight of pigment and thermoplastic material; after intimately mixing the materials the coated cores are spray dried to obtain a toner composition of carbon black core completely surrounded by a tough thermoplastic resin having a softening point below about 250°F.

Electrophotographic copies made with the toners of this invention are of high resolution, sharp accuity of print and low background.

The following examples will further serve to illustrate the preparation of toner compositions in accordance with the presently preferred methods.

EXAMPLE 39

20 grams of Piccolastic A-75 resin (a polystyrene resin having a molecular weight of about 300–400) are dissolved in 380 grams of dichloroethylene at room temperature. 80 grams of dried pigment core material having 80 percent of the particles within the range of 5–15 microns obtained in accordance with Example 5 above is dispersed in the resin solution while agitating the mixture. The dispersion is spray dried in a portable Niro Atomizer spray dryer using the following conditions:

| | |
|---|---|
| Feed Rate: | 20 to 40 ml. per minute |
| Inlet Temp.: | approx. 75°C. |
| Outlet Temp.: | 65–70°C. |
| Atomizing Pressure: | 50 psi. |

In excess of 80 percent of the toner composition particles are in the range of from about 10–25 microns.

EXAMPLE 40

A toner composition is prepared in the same manner as set forth in Example 39 except that Piccolastic A-100 resin (a polystyrene resin having a molecular weight of about 400) is employed.

EXAMPLE 41

A toner composition is prepared in the same manner as set forth in Example 30 except that a mixture of isopropanol and dichloroethylene is used as the resin solvent to reduce the vapor pressure of the solvent medium and facilitate overcoating of the resin on the pigment core.

EXAMPLE 42

20 grams of a mixture containing 40 percent by weight of a Rohm & Haas E-503 resin emulsion (50 percent solids of a butyl acrylate polymer) and 60 percent by weight of Dow 201 Emulsion (50 percent solids of a polystyrene resin having a molecular weight of 85,000) is added to 500 grams of a carbon black pigment core prepared as described in Example 3 hereof, dispersion containing 10 percent by weight of pigment solids under constant agitation. The composite dispersion is spray dried in a portable "Niro Atomizer" spray dryer using the following conditions.

| | |
|---|---|
| Feed Rate: | 20–40 ml/minute |
| Inlet Temp.: | 145–160°C. |
| Outlet Temp.: | 75–100°C. |
| Atomizing Pressure: | 60 psi. |

The particle size distribution of the toner particles is 80 percent within the range of from 10 to 30 microns.

EXAMPLE 43

10 grams of a polyester resin having a melting range of 110°–125°C (Resin 1994-156 of Atlas Chemical Industries) are dissolved in 240 mls. of acetone. To this solution are added 20 grams of the pigment core material prepared in accordance with Example 27, above, while agitating the mixture. The dispersion is spray dried in a Niro Atomizer spray dryer using the following conditions:

| | |
|---|---|
| Feed Rate: | 10 ml. per minute |
| Inlet Temp.: | approx. 25°C. |
| Outlet Temp.: | 35°C. |
| Atomizer Pressure: | 80 psi. |

The toner obtained comprises a pigment core substantially completely surrounded by the thermoplastic polyester resin. Xerographic copies made using this toner are clear and sharp, having good contrast.

EXAMPLE 44

A toner composition is prepared in the same manner as described in Example 43, except that in this case 10 grams of a non-reactive unmodified phenol formaldehyde resin (Amberol ST 137X made by Rohm & Haas) is substituted for the thermoplastic polyester resin used in Example 34. Clear and sharp xerographic copies are obtained when using this toner composition.

EXAMPLE 45

100 Parts of a vinyl acetate-acrylic copolymer resin (50 percent solids) dispersed in water (UCAR180 of Union Carbide Corporation) are added to 50 parts of water and stirred. Then 50 parts of water and 100 parts of a carbon black dispersion comprising 40 parts of carbon black (Cabot Regal SR) 4 parts of sodium salts of polymerized alkyl naphthalene sulfonic acids (Daxad 17 of W. R. Grace & Co.) and 56 parts of water are mixed with the resin solution for about 1 hour. Agglomeration is obtained upon admixture of the carbon black dispersion containing the anionic surfactant with the vinyl acetate-acrylic copolymer resin. Particle size of the carbon black resin coacervate agglomerate was very uniform and in a range of 10–20 microns.

To 90 parts by weight of pigment core prepared as above are added 25 parts by weight of polystyrene resin containing 40 percent solids (Lytron 604 made by Monsanto Chemical Company). The mixture is stirred for about an hour and spray dried in a Niro spray dryer under the following conditions:

| | |
|---|---|
| Feed Rate: | 50 cc per minute |
| Inlet Temp.: | 175°F |
| Outlet Temp.: | 75°F |
| Atomizing Pressure: | 90 psi |

The dry toner composition obtained is a mixture of discrete particles each of which is composed of a pigment core the average mean of such core being from 10–20 microns and a thermoplastic fusible polystyrene resin surrounding said core.

While the foregoing has described the number of alternatives, other equivalent materials and techniques will occur to those skilled in the art from the teachings set forth herein. The invention, therefore, is not limited to the specific embodiments described herein, but may

What is claimed is:

1. A process for preparing larger pigment particles which comprises mixing a coacervatable material with an aqueous dispersion of water-insoluble pigment particles and an ionic surfactant, causing coacervation of said coacervatable material and effecting agglomeration of said pigment particles to an average mean size of from 1–30 microns, and recovering said agglomerated pigment particles.

2. A process as defined in claim 1 wherein said ionic surfactant is a coacervatable material.

3. A process as defined in claim 1 wherein said ionic surfactant is cationic.

4. A process as defined in claim 1 wherein said ionic surfactant is anionic.

5. A process as defined in claim 1 wherein said pigment is carbon black.

6. A process as defined in claim 1 wherein said pigment is titanium dioxide.

7. A process as defined in claim 1 wherein said pigment is an organic water-insoluble dyestuff.

8. A process as defined in claim 1 wherein the average mean size of the pigment particles is from 1–30 microns.

9. A process as defined in claim 1 wherein the pigment particles obtained have an average size within the range of from about 10 to 20 microns, contain no substantial number of particles over about 30 microns, and have at least 80 percent of all particles of a size of from about 5–25 microns.

10. A process for preparing larger pigment particles which comprises forming an aqueous solution of a coacervatable material, incorporating an ionic surfactant and a dispersion of water-insoluble pigment particles of a size of 1 micron or less into said solution, causing coacervation of said coacervatable material and effecting agglomeration of said pigment particles to an average mean size of from 1–30 microns, and recovering said agglomerated pigment particles.

11. A process as defined in claim 10, wherein the pigment is carbon black.

12. A process as defined in claim 10, wherein the pigment is an organic water-insoluble dyestuff.

13. A process as defined in claim 10, wherein said pigment is titanium dioxide.

14. A process as defined in claim 10, wherein said coacervatable material is an ionic surfactant.

15. A process as defined in claim 10, wherein the pigment particles obtained have an average size within the range of from about 10 to 20 microns, contain no substantial number of particles over about 30 microns, and have at least 80 percent of all particles of a size of from about 5–25 microns.

16. A process as defined in claim 15, wherein said coacervatable material is an anionic surfactant.

* * * * *